April 29, 1924.

C. M. COPELAND

APPARATUS FOR MEASURING DEPTH OF WELLS

Filed May 31, 1921 2 Sheets-Sheet 1

1,492,319

INVENTOR.
Clint M. Copeland
BY John M. Spellman
ATTORNEYS.

April 29, 1924. 1,492,319
C. M. COPELAND
APPARATUS FOR MEASURING DEPTH OF WELLS
Filed May 31, 1921 2 Sheets-Sheet 2

Clint M. Copeland
INVENTOR.
BY John M. Spellman
ATTORNEYS.

Patented Apr. 29, 1924.

1,492,319

UNITED STATES PATENT OFFICE.

CLINT M. COPELAND, OF GRAHAM, TEXAS.

APPARATUS FOR MEASURING DEPTH OF WELLS.

Application filed May 31, 1921. Serial No. 473,709.

*To all whom it may concern:*

Be it known that I, CLINT M. COPELAND, a citizen of the United States, residing at Graham, in the county of Young and State of Texas, have invented certain new and useful Improvements in Apparatus for Measuring Depth of Wells, of which the following is a specification.

This invention relates to devices for use in well boring or drilling, particularly oil wells, and pertains more particularly to a novel means for ascertaining the depth of the drilled hole.

So far as I am aware the present method of ascertaining the depth of the hole drilled is by means of a measuring rod whereby the cable or drill stem carrying the drill bit or tools is measured as it is drawn from the well, and it is the principal object of my invention to provide an improved means for automatically measuring the depth of the hole drilled by an arrangement of parts comprising a meter suitably connected to an electric battery and operated by the shaft on which the pulley carrying the cable is supported.

Another object of the invention is to provide a device of this nature whereby the progressive depth of the hole being drilled can be easily ascertained at all times, and the invention has for a further object and is also constructed so that when desired to withdraw the tools their upward progress may be readily known by a reading of the meter.

The invention will be more fully understood by reference to the following description, taken in connection with the accompanying drawings, forming part hereof, in which—

Figure 1:
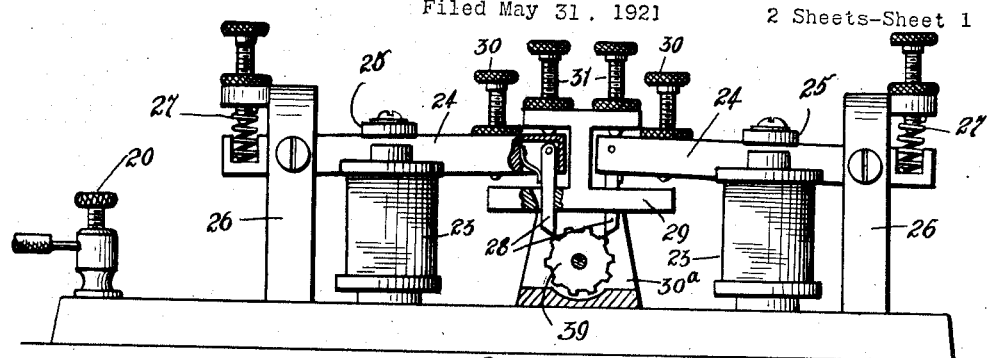
Figure 1 is a side elevational view of the principal part of the invention, the meter being shown in cross-section.

Referring more in detail to the drawings, at the top of a derrick (not shown) is a shaft supporting a pulley upon which the cable carrying the well tools are suspended. The illustration in Figure 3 shows this shaft, it being designated as 1, and provided with a universal joint 2 for connection to a shaft 4, the latter shaft revolubly seated in a housing or framework 5 and carrying a gear wheel 6. Another gear 7 meshes with gear wheel 6 on a shaft 6ª, the latter gear having an annular arrangement of pins 8—8 by means of which a vertically disposed oscillatory contact bar 9 is caused to move backward and forward between contact points 10 and 11 on the terminal posts 12 and 13. The terminal posts are secured to a block 14 in the bottom of the housing and connected by wires 15 and 16. The contact bar 9 is sufficiently resilient to move backward and forward between the contact points 10 and 11, it being seated between the prongs of a terminal post 17, also connected to a wire 18 from the battery—all of which will be referred to later. Wires 15 and 16 are connected to a battery (not shown) and thence pass to and are connected with posts 19 and 20. Likewise the central wire 18 is connected to a post 21—all wires conveying electric current to the meter and parts illustrated in Figures 1 and 2.

Figure 2:
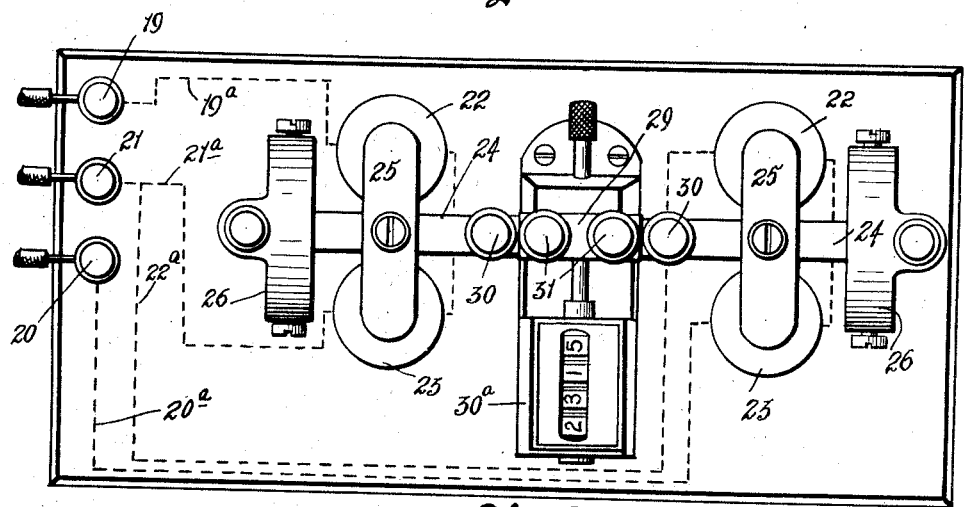
Figure 2 is a top or plan view.
Figure 3:
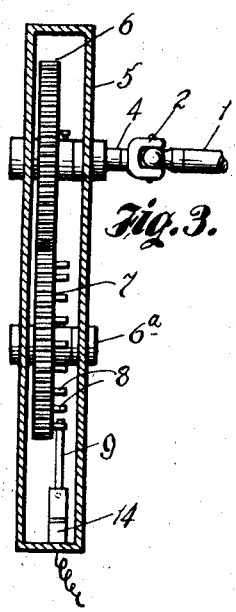
Figure 3 is a vertical transverse sectional view of a housing showing the gears and contact parts for connecting and disconnecting the electric current from a battery, Figure 4 being a vertical sectional view thereof, with the upper part broken away.
Figure 4:
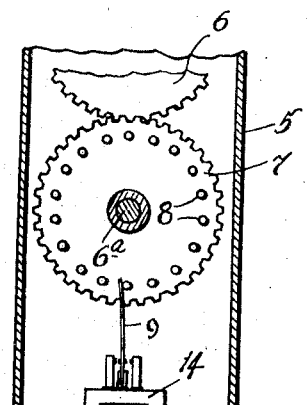
Figure 5:
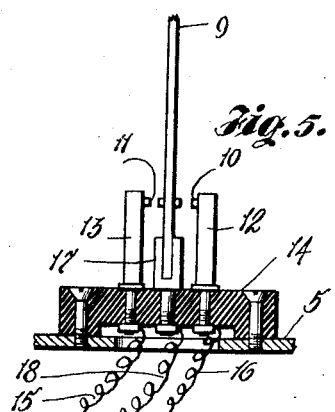
Figure 5 is a detail view of the contact rod and terminal posts.

Referring to Figures 1 and 2, the wires connected to the posts 19 and 21 carry the electric current to oppositely polarized magnets 22 and 23. These magnets are provided with a horizontal bar 24 with a cross-arm 25, the bar being pivoted to a support 26 to move upward and downward, and retracted from its downward position by a spring 27 as the electric current is passed through the magnets. The opposite end of the bar 24 is provided with a loosely pivoted leg 28 which is for the purpose, as clearly shown in the drawing, Figure 1, of operating the meter, which will be referred to later. A T-shaped member 29 is formed integrally with a base or frame 30ª supporting the meter. Adjusting screws 30 and 31 are for the purpose of limiting the movement of the bar 24.

In Figures 1 and 2 a magnet is shown on each side of the meter. Both magnets are the same throughout and bear like numerical references, the use of two magnets being for the purpose of operating the meter in opposite directions.

Referring now to the meter, more clearly shown in Figures 6 to 10, the meter has a framework 30ª which furnishes a housing for protecting its parts, principally the meter disks 33, 34, 35 and 36, and provided with a glass or transparent covering 37. Each disk is attached to a shaft 38 on one end of which shaft is keyed a sprocket gear 39—gear 39 being arranged to be actuated by the legs 28—28, Figure 1.

On the outer face of the gear 39 is a small notched disk 40 for engagement with a pin 41 carried in a small clutch 42 on a knurled pin 43. A spring 44 retracts the clutch from the disk 40. The pin 43 is for the purpose of revolving the disk 33, &c., to move the numbers thereon back to zero, if desired, although arrangement is made, which will be hereinafter referred to, for performing this operation automatically.

Figure 6:
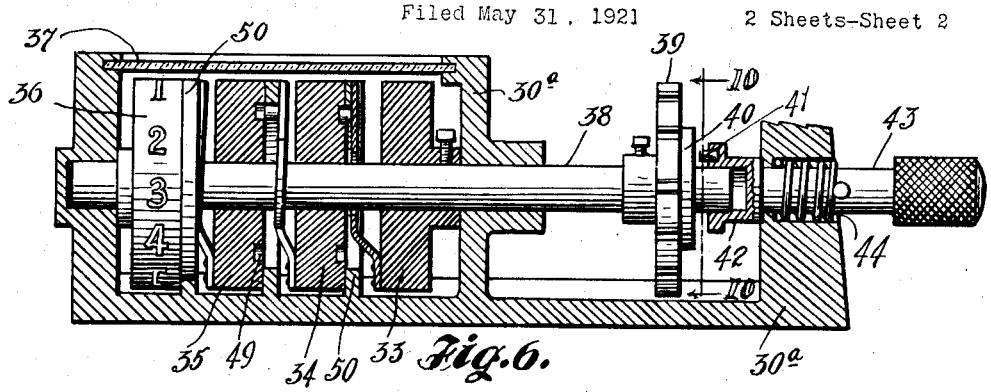
Figure 6 is a longitudinal sectional view of the meter.
Figures 7, 8:
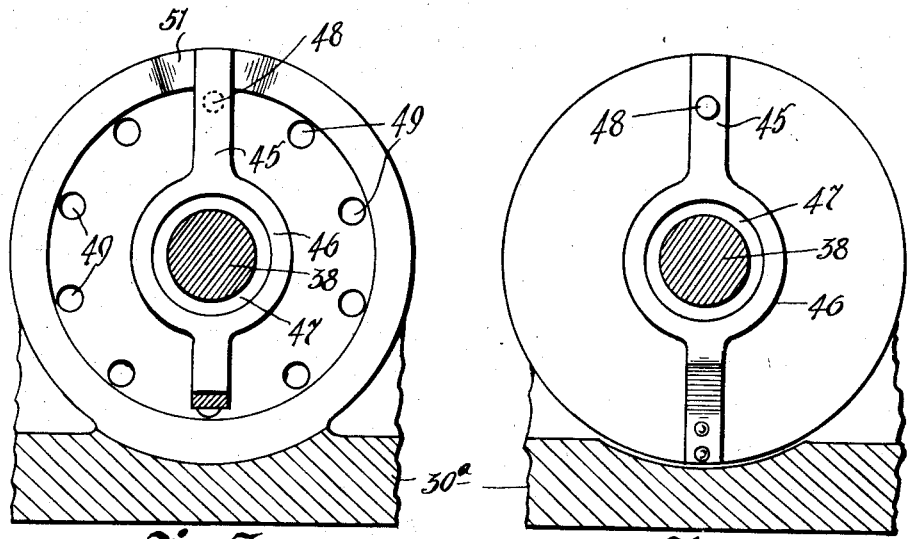
Figure 7 is a cross-sectional view of the meter showing the operative side of one of the numerated disks.
Figure 8 is a cross-sectional view of the actuating disk in one end of the meter.
Figure 9:
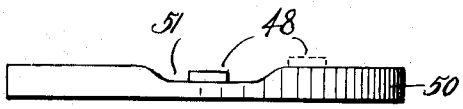
Figure 9 is an edge view of an arm carried on the disks for revolving the disks to register the numerals.
Figure 10:
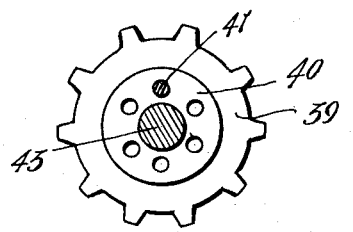
Figure 10 is a side view of a gear for operating the shaft of the meter, the view taken on line 10—10 of Figure 6.

Each disk 33, 34, 35 and 36 has on its edge numerals from one to naught, the disk 33 being keyed to revolve with each revolution of the shaft 38, and has on its inner face a resilient arm 45. This arm has a central circular formation, as at 46, and has an aperture 47 whereby it may turn around the shaft 38. The arm 45 carries a small plug 48 for engagement with the notches 49 in the disks 34, 35 and 36, the arm so arranged, as depicted in Figures 6, 7 and 8, that it will, as each disk rotates, ride around on a collar 50 in front of the disks 34, 35 and 36, the plug 48 falling into and engaging the notch 49 as the depression is reached. Disks 34, 35, and 36 turn loosely on the shaft 38, being revolved by the arms 45.

Referring to Figure 2, the wires 19ª and 21ª indicated by dotted lines which lead from the posts 19 and 21 are connected to one magnet, when the meter is operating in one direction, either for upward or downward movement of the cable or drill stem carrying the drill bit or tools. The dotted lines 20ª and 22ª are wires connected to the opposite magnet to operate the meter in a reverse direction.

In operation the downward or upward movement of the cable will, through its pulley shaft 1, rotate the shaft 4 and gears 6 and 7. Rotation of gear 7 will cause the pins 8—8 to connect with the contact bar 9 which will be moved laterally to connect with the contact points 10 or 11 depending upon in which direction the meter is working for upward or downward movement of the well cable. Thus, if the cable is descending wire 22ª, see Figure 2, will be disconnected so that the electric current will pass through only one magnet, and since the gear 7 would be moving in one direction would connect and disconnect the bar 9 with contact point 11 to operate the magnet, see Figure 1, and depress the arm 24, causing the leg 28 to move the sprocket gear 39 on the shaft 38, see Figure 6. This will cause a revolution of the disk 33 and the arm 45 will move the next disk 34 a fractional distance equal to the space between the depression 51 when the plug 48 falls into the notch 49 and engages the disk. When the plug 48 is not in the notch or notches the arm is free from engagement with the disk and is travelling around the collar 50. This operation is repeated in the other disks, each disk registering the correct number according to the revolutions of initial disk 33, disk 33 making one complete revolution to effect one fractional movement of disks 34, 35 and 36.

When desired to remove the tools from the well the opposite magnet is connected up and the leg 28 will now rotate the sprocket gear 39 in an opposite direction, and thus the disks will revolve to reverse the numbers until the numeral 1 is registered on the meter and the tools on the cable arrive at the top of the hole.

The device has other advantages than measuring the hole depth, as by its use the position in the hole where tools are lost or dislodged from the cable can be ascertained.

Having thus described the nature and objects of the invention, what is claimed is—

In a well depth measuring device, a cable actuated rotary member having a projection, a meter having an operating gear connected thereto, oppositely polarized magnets, a pivoted bar associated with each of the magnets, a pivoted dog carried by each bar and engageable with the teeth on opposite sides of the gear, a T-shaped member having openings at its base for guidingly receiving the dogs and carrying adjusting screws at its top to engage the bars to limit upward movement of the bars, adjusting screws carried by the bars to engage the base of the T-member to limit downward movement of the bars, the bars being pivoted between their ends, coil springs arranged above the outer ends of the springs and exerting downward tension thereon, and means controlled by the projection of the rotary member to effect energization of either of the magnets according to the direction of rotation of the rotary member.

In testimony whereof I have signed my name to this specification.

CLINT M. COPELAND.